(12) United States Patent
Elmasry et al.

(10) Patent No.: US 11,316,718 B1
(45) Date of Patent: Apr. 26, 2022

(54) DYNAMIC SPECTRUM ACCESS CONTROL TRAFFIC OVER MILITARY RADIO VOICE CHANNEL

(71) Applicant: Rockwell Collins, Inc., Cedar Rapids, IA (US)

(72) Inventors: George F. Elmasry, San Marcos, CA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 378 days.

(21) Appl. No.: 16/678,942

(22) Filed: Nov. 8, 2019

(51) Int. Cl.
| H04L 27/00 | (2006.01) |
| H04W 16/10 | (2009.01) |
| H04W 28/04 | (2009.01) |

(52) U.S. Cl.
CPC ......... *H04L 27/0006* (2013.01); *H04W 16/10* (2013.01); *H04W 28/04* (2013.01)

(58) Field of Classification Search
CPC ..... H04W 28/04; H04W 16/10; H04W 16/14; H04L 27/0006
See application file for complete search history.

(56) References Cited

U.S. PATENT DOCUMENTS

| 5,467,344 | A | 11/1995 | Solomon et al. |
| 6,028,933 | A | 2/2000 | Heer et al. |
| 7,512,098 | B2 | 3/2009 | Jiang et al. |
| 8,594,075 | B2 | 11/2013 | Elmasry |
| 10,341,898 | B2 | 7/2019 | Mehta et al. |
| 10,404,866 | B2 | 9/2019 | Russell et al. |
| 2010/0173586 | A1* | 7/2010 | McHenry ............ H04L 27/0006 455/62 |
| 2017/0230908 | A1* | 8/2017 | Agarwal ............. H04W 52/287 |
| 2020/0260464 | A1* | 8/2020 | Zhu ................... H04W 74/0816 |
| 2021/0258988 | A1* | 8/2021 | Balakrishnan ........ H04W 24/10 |

OTHER PUBLICATIONS

Cristian Ianculescu and Andy Mudra, "Cognitive Radio and Dynamic Spectrum Sharing", Proceeding of the SDR 05 Technical Conference and Product Exposition, 2005 SDR Forum (Year: 2005).*

* cited by examiner

*Primary Examiner* — Aristocratis Fotakis
(74) *Attorney, Agent, or Firm* — Suiter Swantz pc llo

(57) ABSTRACT

A system and related method sends Dynamic Spectrum Access (DSA) control traffic via an Over the Air (OTA) waveform in a variety of military voice radios. The system employs a voice to Internet Protocol (IP) conversion to create voice sized frames and redundancy DSA frames recognizable and transmittable by the voice radio. The system dynamically adapts to different types of military waveforms including those which implement: (1) an encoded digitized voice to be divided into frames, (2) an encoded digitized voice to a continual bit stream, (3) direct analog modulation of voice samples, and (4) transmission of voice and data over a single channel. The system adapts to an available channel being voice or non-voice in the military radio enabling DSA control traffic to run with data (in-band) channel or in a voice channel.

15 Claims, 7 Drawing Sheets

DYNAMIC SPECTRUM ACCESS CONTROL TRAFFIC OVER MILITARY RADIO VOICE CHANNEL

BACKGROUND

Traditional commercial communications systems designed for Dynamic Spectrum Access (DSA) capabilities may rely on a Multiple Access Channel (MAC) dedicated for transmission of DSA control traffic. These systems may employ orthogonal signals for over the air (OTA) transmission and use one orthogonal channel for the transmission of DSA control traffic. One or more standards, including a traditional The Long Term Evolution (LTE) standard, may detail such an implementation.

Currently deployed military voice communications systems have no capability to transmit and receive enhanced military waveforms with a dedicated orthogonal channel for DSA control traffic. Some current military waveforms may employ a voice only mode of wireless communication with significant error control coding limitations leaving those operators without a valuable DSA communication ability.

With voice, a five percent packet loss may remain tolerable allowing the listener to comprehend the incomplete transmission. However, attempting to transmit data over the voice waveform, a similar 5% package loss may render the data transmission unsuccessful.

Therefore, a need remains for a system and related method which may overcome these limitations and provide a novel solution to adding a DSA capability to currently deployed military systems using existing military waveforms.

SUMMARY

In one aspect, embodiments of the inventive concepts disclosed herein are directed to a system for dynamic spectrum access control signals over a voice channel. The system may comprise a voice waveform radio having one of: a plurality of channels and a single channel, the voice waveform radio configured to transmit and receive via a radio voice path and a controller operatively coupled with the voice waveform radio.

For storage of data, the system may include a tangible, non-transitory memory configured to communicate with the controller, the tangible, non-transitory memory having instructions stored therein that, in response to execution by the controller, cause the controller to carry out one or more tasks of the system.

The controller may interrogate the voice waveform radio to determine a voice frame size usable by the voice waveform radio and receive a dynamic spectrum access (DSA) control packet initiated by a user. The controller may segment the DSA control packet into a plurality of DSA frames, each DSA frame having a DSA frame size equal to the voice frame size and determine if the voice waveform radio employs one of: a voice frame format or a digital bit stream format. The controller may sense, if the voice waveform radio employs the digital bit stream format, a silent period during which the voice waveform radio is not transmitting a voice signal and may convert each of the plurality of DSA frames and the redundancy DSA frames to one of the voice frame format or the digital bit stream format based on the determining.

The controller may generate one or more redundancy DSA frames at the DSA frame size using a frame based erasure coding if the voice waveform radio employs the voice frame format and a segment based erasure coding if the voice waveform radio employs the digital bit stream format and encode each of the plurality of DSA frames and the redundancy DSA frames using the frame based erasure coding if the voice waveform radio employs the voice frame format and the segment based erasure coding if the voice waveform radio employs the digital bit stream format The controller may transmit each of the plurality of DSA frames and the redundancy DSA frames over the air (OTA) along the radio voice path via one of: 1) one of the plurality of channels and 2) the single channel during the sensed silent period.

A further embodiment of the inventive concepts disclosed herein may include a method for dynamic spectrum access control signals over a voice channel. The method may comprise interrogating a voice waveform radio to determine a voice frame size usable by a voice path of the voice waveform radio and receiving a dynamic spectrum access (DSA) control Internet Protocol (IP) packet. The method may further include segmenting the DSA control IP packet into a plurality of DSA IP frames, each DSA IP frame having a DSA IP frame size equal to the voice frame size and a DSA IP frame identification similar to a voice frame identification.

The method may further include determining if the voice waveform radio employs one of: a voice frame format or a digital bit stream format and sensing, if the voice waveform radio employs the digital bit stream format, a silent period during which the voice waveform radio is not transmitting a voice signal. The method may further include converting each of the plurality of DSA frames and the redundancy DSA frames to one of: the voice frame format for a Combat Network Radio (CNR) or the digital bit stream format for a push to talk (PTT) radio based on the determining and generating a redundancy DSA frame at the DSA frame size using one of: a frame based erasure coding if the voice waveform radio employs the voice frame format and a segment based erasure coding if the voice waveform radio employs the digital bit stream format.

The method may further include encoding each of the DSA IP frames and the at least one redundancy DSA IP frame using one of: the frame based erasure coding if the voice waveform radio employs the voice frame format and the segment based erasure coding if the voice waveform radio employs the digital bit stream format. The method may include transmitting each of the plurality of DSA frames and the redundancy DSA frames over the air (OTA) along the radio voice path via one of: 1) one of the plurality of channels and 2) the single channel during the sensed silent period.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
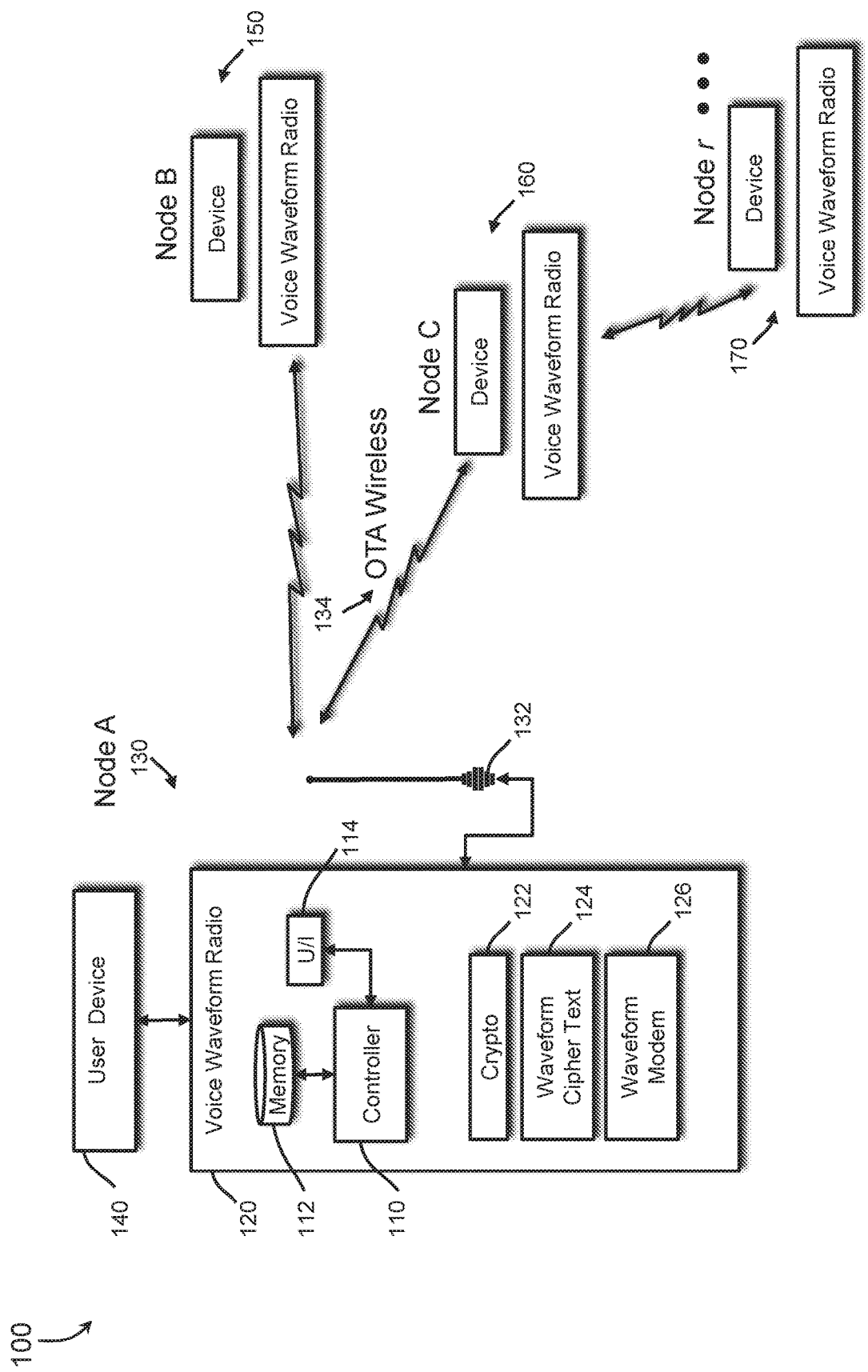
FIG. 1 is a diagram of a system for system for dynamic spectrum access control signals over a voice channel in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and related method sends Dynamic Spectrum Access (DSA) control traffic via an Over the Air (OTA) waveform in a variety of military voice radios. The system employs a voice to Internet Protocol (IP) conversion to create voice sized frames and redundancy DSA frames recognizable and transmittable by the voice radio. The system dynamically adapts to different types of military waveforms including those which implement: (1) an encoded digitized voice to be divided into frames, (2) an encoded digitized voice to a continual bit stream, (3) direct analog modulation of voice samples, and (4) transmission of voice and data over a single channel. The system adapts to an available channel being voice or non-voice in the military radio enabling DSA control traffic to run with data (in-band) channel or in a voice channel

| REFERENCE CHART |
|---|
| 100 System for DSA over Voice |
| 110 Controller |
| 112 Memory |
| 114 User Interface |
| 120 Voice Waveform Radio |
| 122 Crypto |
| 124 Waveform Ciphertext |
| 126 Waveform Modem |
| 128 Voice Codec |
| 130 Node A |
| 132 Voice Radio Antenna |
| 134 OTA Wireless RF Signal |
| 140 Node A User Device |
| 150 Node B |
| 160 Node C |
| 170 Node r |
| 200 Node Detail |
| 202 Voice Path |
| 204 Data Path |
| 206 Plain Text IP |
| 230 IP to Voice Converter |
| 300 IP to Voice Conversion |
| 330 DSA Control Packet |
| 332 DSA Control Packet Size |
| 340 DSA Frame |
| 340 DSA Frame Size |
| 344 DSA Frame ID |
| 346 Redundancy DSA Frame |
| 350 Assembled DSA Control Packet |
| 352 Received DSA Frame |
| 354 Lost DSA Frame |
| 356 Received Redundancy DSA frame |
| 400 Adaptability Transmit |

-continued

REFERENCE CHART

| | |
|---|---|
| 402 | IP to Voice Frame Conversion |
| 404 | Frame Based Erasure Coding |
| 406 | Combat Network Radio (CNR) |
| 412 | IP/Bit Stream Conversion |
| 414 | Segment Based Erasure Coding |
| 416 | Digital Push to Talk (PTT) |
| 422 | Other Voice Data Types Coding |
| 424 | Digital/Analog Modem |
| 426 | Analog PTT |
| 500 | Adaptability Receive |
| 502 | CNR Voice/IP Conversion |
| 504 | Frame Based Erasure Decoding |
| 512 | PTT Voice/IP Conversion |
| 514 | Segment Based Erasure Decoding |
| 522 | Other Voice/Data Types Decoding |
| 600 | Probability of Reliability Graph |
| 616 | 95% Reliability Point |
| 700 | Method Flow |
| 702 | Interrogating Voice Radio |
| 704 | Receiving a DSA Control IP Packet |
| 706 | Segmenting into DSA IP Frames |
| 708 | Generating Redundancy DSA IP Frame |
| 710 | Determining One or Multiple Channels |
| 712 | Sensing Silence Period |
| 714 | Converting IP to CNA or PTT |
| 716 | Encoding Erasure or Frame Based |
| 718 | Transmitting IP Frames and Redundancy Frames |

FIG. 1

Referring to FIG. 1, a diagram of a system for system for dynamic spectrum access control signals over a voice channel in accordance with an embodiment of the inventive concepts disclosed herein is shown. Generally, a system for dynamic spectrum access control signals over a voice channel 100 may include a Node A 130 configured for sending and receiving wireless radio frequency (RF) signals 134 over the air (OTA) to and from a plurality of nodes: Node B 150, Node C 160, Node D 170, in an RF network. The voice waveform radio 120 may further couple with a user device 140 configured for sharing data with a plurality of devices associated with each node.

Depending on the specific type, a voice waveform radio 120 may have a plurality of channels or a single channel within which the voice waveform radio 120 may transmit and receive via a radio voice path. The voice waveform radio 120 may include a controller 110, a memory 112 and a user interface 114 each operatively coupled with the voice waveform radio 120.

In one embodiment of the inventive concepts disclosed herein, the voice waveform radio 120 may be specifically suited for military waveforms that implement multiple voice channels. These military waveforms may have more than one voice channel available where one of the voice channels may be used for DSA control traffic. Embodiments herein may detail one use of a voice channel for DSA control traffic. However, the concepts disclosed herein should not be limited to DSA traffic over a voice channel as these concepts disclosed herein may be directly applicable to any type of control traffic over any available transmission media.

The voice waveform radio 120 may also include a crypto 122, a waveform ciphertext 124, and a waveform modem 126 comprising a "lower stack" of the voice waveform radio 120 functional to perform tasks associated with the voice waveform radio 120. The voice waveform radio 120 may employ a Voice Radio Antenna 132 configured to send and receive the OTA Wireless RF Signals 134.

In one embodiment of the inventive concepts disclosed herein, the memory 112 may include a tangible, non-transitory memory configured to communicate with the controller 110, the tangible, non-transitory memory having instructions stored therein that, in response to execution by the controller 110, cause the controller 110 to carry out the operations of the voice waveform radio 120 as well as perform tasks of the system for dynamic spectrum access control signals over a voice channel 100.

In one embodiment of the inventive concepts disclosed herein, the DSA control traffic may differ from voice traffic as voice traffic may tend to be broadcast so the voice broadcast may reach every node within range. DSA traffic may traverse more than one OTA hop from a node C 150 to a distant node r 170 beyond a range of node A 130. This will increase unreliability. For example, with two OTA hops and each hop maintains a 10% frame loss, a cumulative loss may be 19% which is unacceptable for DSA control traffic.

FIG. 2

Figure 2:
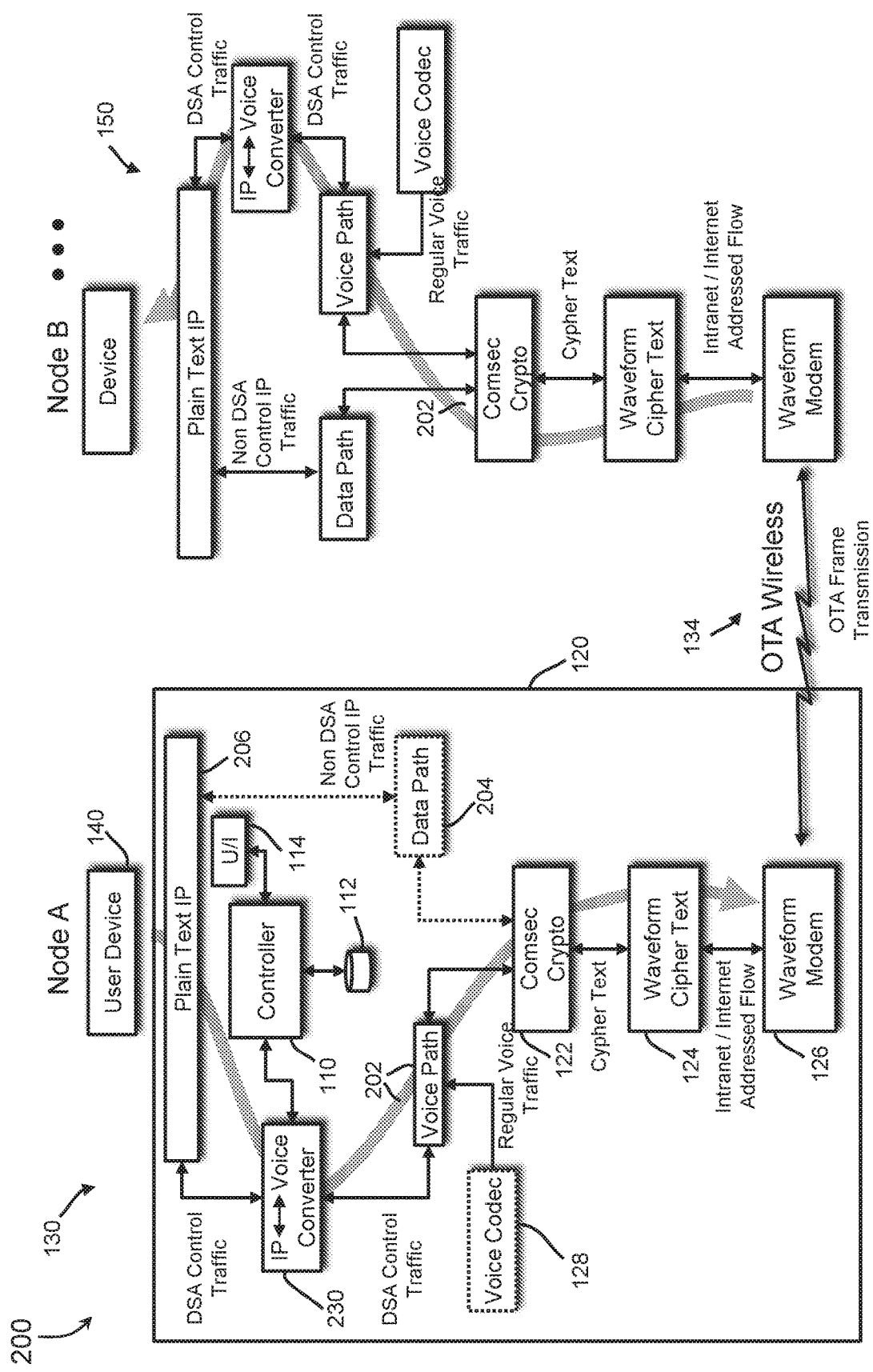
FIG. 2 is a diagram of a node detail in accordance with an embodiment of the inventive concepts disclosed herein.

Referring now to FIG. 2, a diagram of a node detail in accordance with an embodiment of the inventive concepts disclosed herein is shown. A node detail 200 may include detail of a military wireless communications system illustrated using two nodes (node A 130 and node B 140) that represent a transmitting node (A) and a receiving node (B) in a military formed net. In that net, the number of nodes can be very large and the illustration with two nodes is meant for clarity of representing transmission and receiving over the military wireless communication system.

In one embodiment of the inventive concepts disclosed herein, the voice waveform radio 120 may include a voice codec 128, a voice path 202, and a data path 204. A plain text IP layer 206 may function to route a plain text IP packet from the user device 140 to the IP/voice converter 230 via the voice path 202 instead of routing it to the data path 204.

In one embodiment of the inventive concepts disclosed herein, the voice path 202 may be mapped to more than one voice channel in the case of the multi-channel radio and the controller 110 may dedicate a single voice channel for the DSA traffic flow while the controller 110 may assign the vintage voice traffic to a different voice channel. In other embodiments where the radio has a single voice channel, the controller may sense a silent period where the user may be silent to transmit DSA control traffic over the single channel.

The voice codec 128 may function to generate vintage voice traffic while, in military radios, the crypto (comsec) layer 122. The controller 110 may route crypto data IP traffic differently than voice via the data path 204 as military radios may employ a specific voice codec different from a commercial Voice over IP (VoIP) codecs. Traditionally, a legacy system may route voice frames differently than large size IP packets.

Additionally, embodiments herein may employ military security (comsec/crypto) encryption of military waveforms and utilize this voice channel at the plain text layer 206. This may contrast with commercial systems using an orthogonal Media Access Control (MAC) for DSA traffic. These commercial systems may have no consideration for military comsec encryption. While in commercial systems, the DSA control traffic is known to be DSA control traffic before transmission OTA, in military systems, DSA control traffic can be generated at the plain text layer 206 and the cipher text layer 124 may not be able to identify DSA control messages before transmission OTA. This military crypto limitation may necessitate mapping of the DSA control traffic to a voice channel at the plain text layer 206.

In one embodiment of the inventive concepts disclosed herein, the DSA control traffic may be mapped to a voice channel at an upper protocol stack layer at the IP to vice converter 230 before the comsec encryption 122. Also applicable to additional types of control traffic including non-IP control traffic, embodiments herein may adapt to each military radio even if the radio has a single channel that transmits voice and data frames in-band.

System Function

In one embodiment of the inventive concepts disclosed herein, the controller 110 may interrogate the voice waveform radio 120 to determine a voice frame size usable by the voice waveform radio 120. The controller 110 may then receive a large size DSA control packet initiated by a user. The DSA control packet may be too large for the voice waveform radio 120 to pass through the lower stack and, if it were to pass, the DSA control packet may become corrupted precluding reception by any of the other nodes in the network.

In embodiments, the DSA control packet may include one of a plurality of message types including a DSA control IP packet intended for a network of Single Channel Ground and Airborne Radio System (SINCGARS) Combat Net Radios (CNR), an internet protocol (IP) control packet, and a Joint Tactical Information Distribution System (JTIDS) control message as well as additional types of control messages configured to match the military network in use by each of the nodes A 130 through Node r 170. For example, one such control message may initiate a network of Enhanced Position Location Reporting System (EPLRS) configured radios as well as a Link-16 formatted message intended for a plurality of Multifunctional Information Distribution System (MIDS) Joint Tactical Radio System (JTRS) radios.

In one embodiment of the inventive concepts disclosed herein, the OTA wireless communications media 134 may be a multiple access media where multiple nodes are configured to receive a single OTA transmission (e.g., from Node A 140). The Node A 140 may One embodiment of this invention is the utilization of the multiple access media to propagate the DSA control traffic with a minimal use of OTA resources. That is, one DSA control transmission may be received by all nodes within one OTA hop away from the transmitting node. Here, the controller 110 may command multiple access capabilities of the voice waveform radio for DSA control traffic saving OTA resources, increasing transmission reliability, and reducing message completion time to prevent a resource-costly message retransmission.

Once the controller determines the correct frame size, the controller 110 may employ the voice to IP converter 230 to segment the DSA control packet into a plurality of DSA frames, each DSA frame having a DSA frame size equal to the voice frame size and a DSA frame identification similar to a voice frame identification. Here, with each DSA frame the same size as a voice frame the voice waveform radio 120 may expect to receive, the voice waveform radio 120 may pass the plurality of DSA frames along as it would normally with a traditional voice frame.

To ensure message security and increase a reliability of the DSA control packet being received at node B 150, the controller 110 may employ the voice to IP converter 230 to generate at least one redundancy DSA frame at the DSA frame size via an error control erasure coding, the redundancy DSA frame may be configured to replace a data within at least one of the plurality of DSA frames. Because of likely unreliable wireless communications environments within the OTA wireless 134, the system for dynamic spectrum access control signals over a voice channel 100 may function to add one or more redundancy DSA frames to the plurality of DSA frames to increase a reliability of reception at node B 150.

As a certain probability exists that some DSA frames may be lost, the controller 110 may function to increase the probability of delivering a complete DSA control message to node B 150. Under average condition, one probability of delivering a voice frame may range from 0.98 to 0.90 per virtually all military radios specifications. The addition of the redundancy DSA frames increases that probability.

The controller 110 may determine if the voice waveform radio 120 employs a voice frame format or a digital bit stream format. If the controller 110 determines the voice waveform radio 120 employs a single channel, the controller 110 may sense a silent period during which the voice waveform radio is not transmitting a voice signal to transmit the segmented DSA frames. In some embodiments, the controller 110 may function to sense the silent period in any radio and transmit during the silent periods on a single channel or one or more channels of a multi-channel radio.

The controller 110 may employ the voice to IP converter 230 to convert each of the plurality of DSA frames and the redundancy DSA frames to one of a CNR format if the voice waveform radio employs the voice frame format or a push to talk (PTT) format if the voice waveform radio employs a bit stream format. The voice to IP converter 230 may also encode each of the plurality of DSA frames and the redundancy DSA frames a frame based erasure coding if the voice waveform radio employs the voice frame format and segment based erasure coding if the voice waveform radio employs the bit stream format.

For transmission of the signals, the controller 110 may transmit each of the plurality of DSA frames and the at least one redundancy DSA frame wirelessly OTA 134 along the radio voice path 202 via one of: 1) one of the plurality of channels if the voice waveform radio employs the plurality of channels and 2) the single channel during the sensed at least one silent period if the voice waveform radio employs a single channel.

In one embodiment of the inventive concepts disclosed herein, the controller within the node B 150 may receive and reconstruct the received plurality of DSA frames and the at least one redundancy DSA frame corresponding to DSA control traffic, albeit likely reduced in number by OTA loss. The node B controller may then route each of the plurality of DSA frames and the at least one redundancy DSA frame to the node B waveform cipher text side, then to the comsec crypto layer, where it follows the voice path 202 and reaches the node B IP/voice converter for conversion to the DSA control message.

FIG. 3

Figure 3:
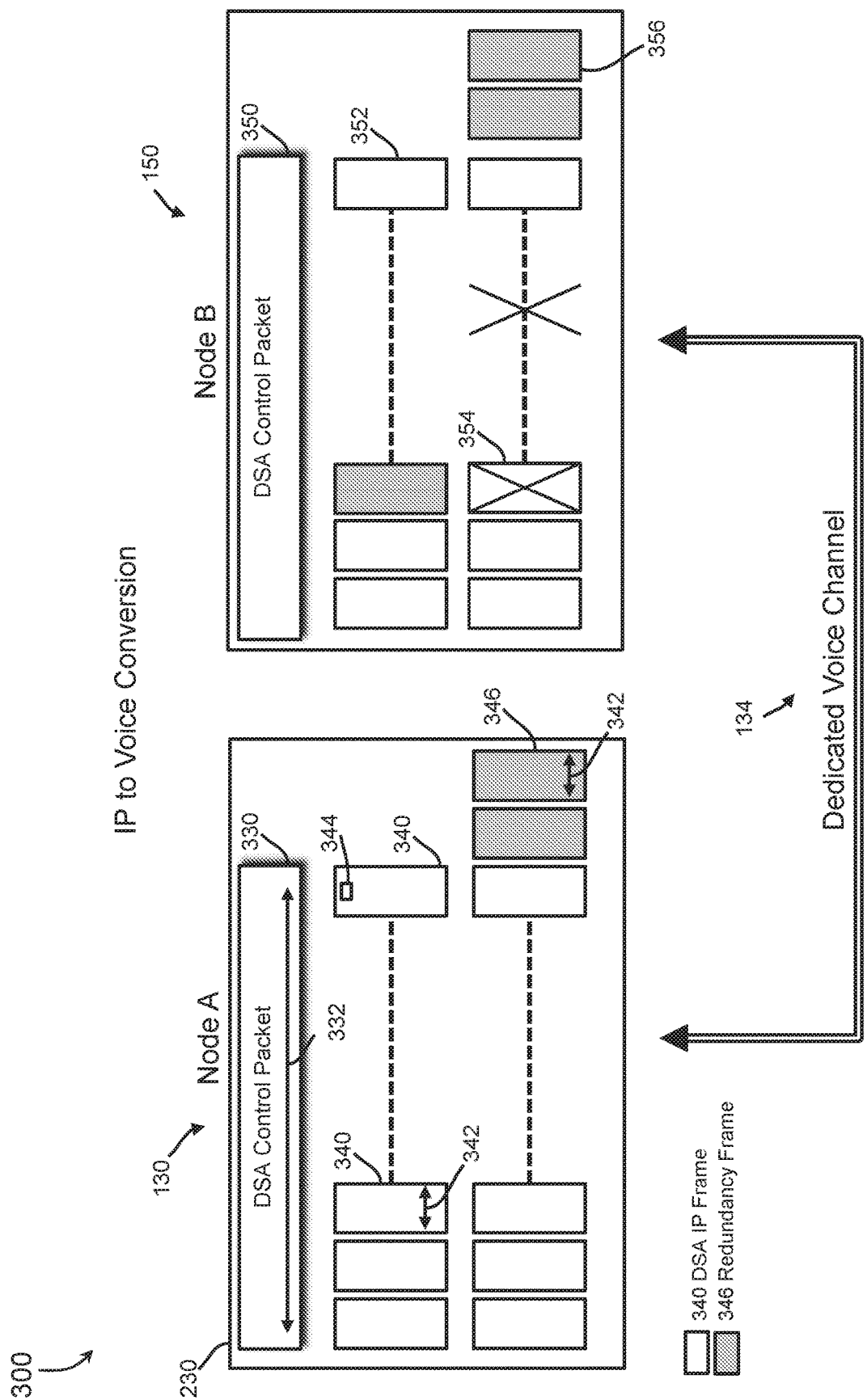
FIG. 3 is a diagram of an IP to voice conversion exemplary of an embodiment of the inventive concepts disclosed herein.

Referring now to FIG. 3, a diagram of an IP to voice conversion exemplary of an embodiment of the inventive concepts disclosed herein is shown. The controller 110 may employ the IP to voice converter 230 to segment the large DSA control packet 330 having a significant DSA Control Packet Size 332 (e.g., approximately 1500 bytes) to a plurality of smaller sized DSA frames 340 having a DSA frame size 340 (e.g., approximately 30 to 50 bytes) equal to the voice frame size expected by the voice waveform radio 120. Here, the DSA frame size 340 may depend on the characteristics of the specific voice channel within the voice waveform radio 120 to which the DSA traffic may be mapped.

In addition, the controller 110 may command the IP to voice converter 230 to generate one or more redundancy DSA frames 346 configured to replace any lost ones of the plurality of DSA frames 340 on the reception side at node B 150. The IP to voice converter 230 may apply erasure coding where the erasure size equals the voice frame size and add the redundancy DSA frames 346 representative of all the frames in a single DSA control packet 330. The details of the error control erasure coding are beyond the scope of this application, however, in one embodiment of the inventive concepts disclosed herein, the IP to voice converter 230 may employ systematic Reed/Solomon (RS) coding where any transmitted IP packet over voice frames consist of n frames and where k frames are all the frames of the DSA IP packets. Therefore, n–k frames may equal the number of redundancy DSA frames.

In one embodiment of the inventive concepts disclosed herein, at node B 150, the node B controller may receive an intact Received DSA Frame 352 and likely encounter a missing or lost DSA frame 354. However, with the reception of one or more received redundancy DSA frames 356, the node B controller may have a higher percentage of reconstructing a complete assembled DSA control packet 350.

With reference to FIG. 3, a k number of frames may be illustrated as the plurality of DSA frames 340 while an n–k number of frames may be indicated as the redundancy DSA frames 346. The controller 110 may transmit the n number of frames over the selected voice channel(s) OTA 134. The controller 110 may command the frames may be interleaved before sending to the voice channel where the plurality of DSA frames 340 may be sent over a first voice channel and the redundancy DSA frames 346 may be sent over a second voice channel if the voice waveform radio 120 may allow. At the receiving node B 150, as long as the number of lost frames 354 within n frames is less than or equal to n–k frames, the IP to voice converter 230 within the node B 150 may be able to successfully recover lost frames within the received DSA control packet 350 and reconstruct the original DSA control packet 340 without error.

In one embodiment of the inventive concepts disclosed herein, the controller 110 may command the IP to voice converter 230 to apply a DSA frame ID 344 to each of the plurality of DSA frames 340 and the redundancy DSA frames 346.

In one embodiment of the inventive concepts disclosed herein, if the voice waveform radio 120 may expect a continual bit stream (e.g., PTT) instead of frames (e.g., CNR), a voice waveform radio 120 coding characteristic may influence how the controller 110 may command the IP to voice converter 230 to segment the DSA control packet 340 before applying the erasure coding. The size of the plurality of DSA frames may correlate to an expected erasure size.

Adding Redundancy DSA Frames

However, adding redundancy DSA frames 346 to the OTA transmission may also add to an overall undesirable OTA resource utilization. For example, the controller 110 may command one DSA control packet 330 to be segmented into an exemplary 20 frames 340 while adding two redundancy DSA frames 346. In this scenario, a price of adding the two redundancy DSA frames 346 may include an increase in OTA resource utilization by 10%. However, had the 2 redundancy DSA frames 346 not have been added and the controller 110 transmitted the DSA IP packet frames 340 over a channel with a probability of delivering a voice frame of 0.95 (95%), the system for dynamic spectrum access control signals over a voice channel 100 may have transmitted this DSA control packet with an decreased probability of node B 150 receiving an entire DSA control packet 350 and retransmitting this DSA control packet of approximately 0.45 (45%). For the 10% increase in utilizing OTA resources with the additional two redundancy DSA frames 346, adding the two redundancy DSA frames 346 may save 45% of utilizing OTA resources for eventual IP packet retransmission.

In addition to optimizing the use of OTA resources, efficiencies within the system for dynamic spectrum access control signals over a voice channel 100 may speed up the delivery of DSA IP traffic. In a dynamic environment where DSA decisions are communicated to the nodes 150 160 170 and the nodes are expected to quickly switch to a new frequency, the speed of delivery may be a critical factor in communication and mission success. The system for dynamic spectrum access control signals over a voice channel 100 using the redundancy DSA frames 346 may prevent a retransmission of DSA control packets 330 and hence speed up the time it takes to complete the transmission of a single DSA message that can be composed of one or more IP packets. This factor may bias the controller 110 to more heavily rely on the redundancy DSA frame 346 to bring to the probability of delivering a DSA control packet 330 near 100% in order to ensure that DSA IP packets are reliably and quickly delivered.

In one embodiment of the inventive concepts disclosed herein, the controller 110 may command an interleaving of the plurality of DSA frames as well as the redundancy DSA frames (segments of the DSA IP packet) between different voice channels if the radio is equipped with more than one channel usable for DSA traffic. For example, the plurality of DSA frames may be sent over a first voice channel while redundancy DSA frames may be sent over a second voice channel. With this type of interleaving, if one channel is more reliable than the other, the probability of reconstructing the DSA control packet may be higher than if all frames are sent over a single unreliable channel.

In addition, the controller 110 may increase or decrease the redundancy DSA frames 346 adaptively corresponding to a reliability of the OTA wireless path 134. The controller 110 may determine if the voice channel is known to be reliable, and reduce the number of redundancy DSA frames 346 whereas if unreliable, the controller 110 may increase the number.

In one embodiment of the inventive concepts disclosed herein, the system for dynamic spectrum access control signals over a voice channel 100 may take advantage of military radios cooperative transmission slots for voice traffic. In military communications systems, voice traffic may have special consideration where voice OTA frames are transmitted broadcast to take advantage of the military waveform multiple access capabilities where one frame transmitted OTA may reach all nodes using one OTA hop away from the transmitting node. Each receiving node lower protocol stack may be able to receive multiple copies of the same frame when the net is in possession of multiple OTA hops. The receiving nodes may receive and process the multiple frame copies to reduce the likelihood of constructing a control message using a corrupt frame. With cooperative transmission slots for voice traffic, the probability of reception of a corrupt voice frame may be much lower than the probability of reception of a corrupt data frame from a data packet.

In one embodiment of the inventive concepts disclosed herein, the controller 110 may measure a frame loss ratio of the voice path 202 and dynamically increase or decrease a number of the redundancy DSA frames 346 to achieve a desired frame reception reliability. Also, the controller 110 may receive a level of importance of the plurality of DSA frames 340 and dynamically increase a number of the redundancy DSA frames 346 to increase a frame reception reliability.

Further, embodiments of the inventive concepts disclosed herein may align a transmission time of sending the packet segments (frames) to the timing of a voice channel using broadcast cooperative multipath where each node may be given a specific time to broadcast and nodes may receive multiple version of the same frame and use error cancellation to reliably reconstruct a DSA control packet 330 from multiple received versions of a frame.

FIG. 4

Figure 4:
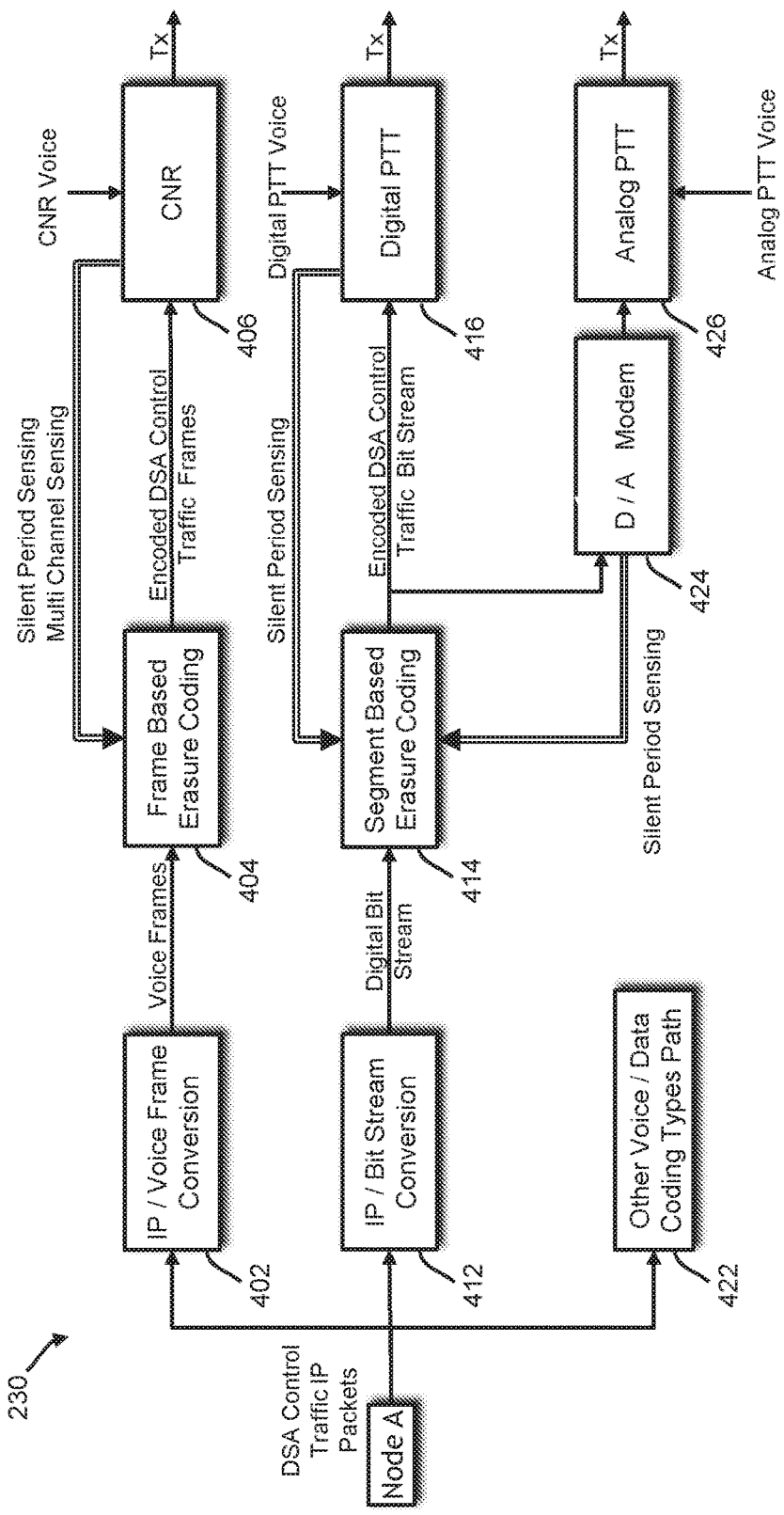
FIG. 4 is a diagram of an adaptability in transmit exemplary of one embodiment of the inventive concepts disclosed herein.

Referring now to FIG. 4, a diagram of an adaptability in transmit exemplary of one embodiment of the inventive concepts disclosed herein is shown. The adaptability transmit 400 within the IP to voice converter 230 may include an exemplary two voice path flows: a voice frame flow leading to the CNR 406 for voice channels which expect voice frames such as the CNR 406 type and a digital bit stream flow transmission leading to the digital PTT 416 or analog PTT 426.

In one embodiment of the inventive concepts disclosed herein, the controller 110 may determine if the voice waveform radio 120 employs one of: the voice frame format or the digital bit stream format and sense, if the voice waveform radio employs the digital bit stream format, at least one silent period during which the voice waveform radio is not transmitting a voice signal. In this manner, the controller 110 may route the DSA control IP traffic to either of the transmission flows (voice frame or bit stream) based on the type of coding usable by the voice waveform radio 120.

The controller 110 may then convert each of the plurality of DSA frames and the at least one redundancy DSA frame to one of the voice frame format or the digital bit stream format based on the determining. The controller 110 may employ an IP to voice frame conversion 402 and a frame based erasure coding 404 path to route the DSA control traffic to the CNR 406 type of voice waveform radio 120. Conversely, the controller 110 may route the bit stream format DSA IP control traffic via an IP/bit stream conversion 412, and a segment based erasure coding 414 to one of the digital PTT 416 or via the digital/analog modem 424 to the Analog PTT 426. With the bit stream path, the controller 110 may map each IP packet to a bit stream. Here, the controller 110 may segment the bit stream based on expected erasure size allowing the erasure coding 414 to add new redundancy frames 346 then the controller 110 may send the plurality of DSA frames 340 as well as the redundancy DSA frames 346 to the lower stack layer as a but stream.

In one embodiment of the inventive concepts disclosed herein, because a low parity code within the frame based erasure coding 404 and segment based erasure coding 414 is a symmetric coding, the plurality of DSA frames 340 may be unchanged by the coding. The frame based and segment based encoding process may produce the redundancy frames 346. In one embodiment, the controller 110 may establish a transmission order wherein the plurality of DSA frames is transmitted first at a pace to finish transmission contemporaneously with a completion of the generating the redundancy DSA frames and transmitting the at least one redundancy DSA frame second. This pace of transmission of the plurality of DSA frames 340 during erasure coding (generating the redundancy frames 346) may efficiently use the OTA resources to contemporaneously finish transmission of the plurality of DSA frames 340 at the time the erasure coding 404 414 finishes producing the redundancy frames 346.

In one embodiment of the inventive concepts disclosed herein, the controller 110 may also route additional types of DSA IP traffic to other voice data types coding 422 should a voice waveform radio 120 require additional formats.

Additionally, the controller 110 may adapt the DSA control traffic to a voice waveform radio 120 having a single voice channel. The controller 110 may sense silent voice periods where the voice codec 128 is not handing the voice path 220 to transmit and use these silent "gaps" to transmit the DSA control traffic. It is worth mentioning that this opportunistic use of voice silent periods may yield good performance since most voice waveform radios 120 have a high percentage of silent periods. It is estimated that in commercial VoIP applications more than 40% of the time may be silent periods since the interactive voice indicates that one side of the conversation talks while the other side listens with some chances of overlap. With military voice codec 128, a group of soldiers sharing a voice channel may create a much higher percentage of the silent periods since these soldiers tend to listen most of the time and only talk as necessary. The adaptation of the system for dynamic spectrum access control signals over a voice channel 100 to the voice waveform radio 120 using a waveform with a single voice channel may indicate will likely successful deployment over a variety of military waveform radios having a voice channel since all military waveforms at a lower echelon have at minimum at least one voice channel if not three or four.

In one embodiment of the inventive concepts disclosed herein, the controller 110 may receive a plurality of types of sensitive control traffic and successfully send and receive this plurality of types of sensitive control traffic not limited to DSA control traffic. For example, the system for dynamic spectrum access control signals over a voice channel 100 may be specifically adaptable to controlling a mobile ad hoc network (MANET) sending the required control traffic via the voice waveform radio 120.

In one embodiment of the inventive concepts disclosed herein, the controller 110 may adapt the system for dynamic spectrum access control signals over a voice channel 100 to use any available radio resources including a dedicated voice channel for DSA traffic, multiple available voice channels, sharing of a single voice channel between voice traffic and DSA traffic using silent periods, and any in-band channel for both voice and data. This unique adaptability may also apply to different types of voice channels where the controller 110 may dynamically change segment (frame) size, dynamically change the number of redundancy DSA frames and dynamically change how frames are assigned to channels while interleaving frames to randomize burst frame erasures. The controller 110 may further adapt the system for dynamic spectrum access control signals over a voice channel 100 for use of channels with cooperative transmission capabilities to include cooperative multipath and cooperative virtual multipath.

FIG. 5

Figure 5:
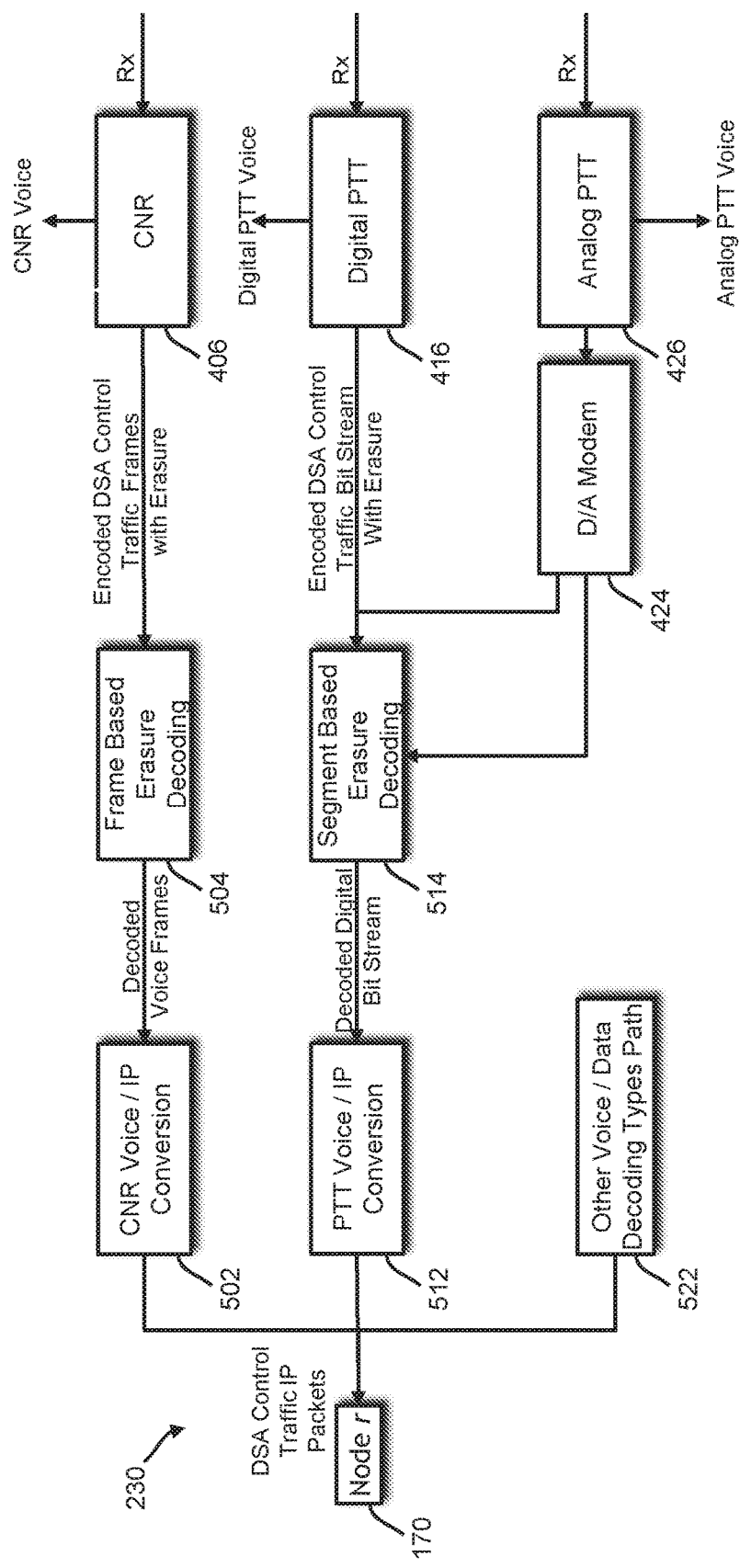
FIG. 5 is a diagram of an adaptability in receive in accordance with one embodiment of the inventive concepts disclosed herein.

Referring now to FIG. 5, a diagram of an adaptability in receive in accordance with one embodiment of the inventive concepts disclosed herein is shown. The adaptability in receive 500 within the IP to voice converter 230 may provide reception adaptability capabilities of the system for dynamic spectrum access control signals over a voice channel 100. As a signal may be received by a node r 170 via one of the three types of voice waveform radios 406 416 426 the controller 110 may direct the signal processing in a reverse direction from the transmit (FIG. 4). Along the voice frame path (top), the received CNR signal may be decoded via a Frame Based Erasure Decoding 504 and converted via a CNR Voice/IP Conversion 502 and may supply the node r 170 IP plain text layer with a complete DSA control packet 350.

In one embodiment of the inventive concepts disclosed herein, if a bit stream path may be employed, the signal may be received via the digital 416 or analog 426 PTT radio and decoded via a Segment Based Erasure Decoding 514 then converted via a PTT Voice/IP Conversion 512.

Similarly, the system for dynamic spectrum access control signals over a voice channel 100 may be configured to receive additional types of coded transmissions and receive and decode via other voice/data types decoding 522.

FIG. 6

Figure 6:
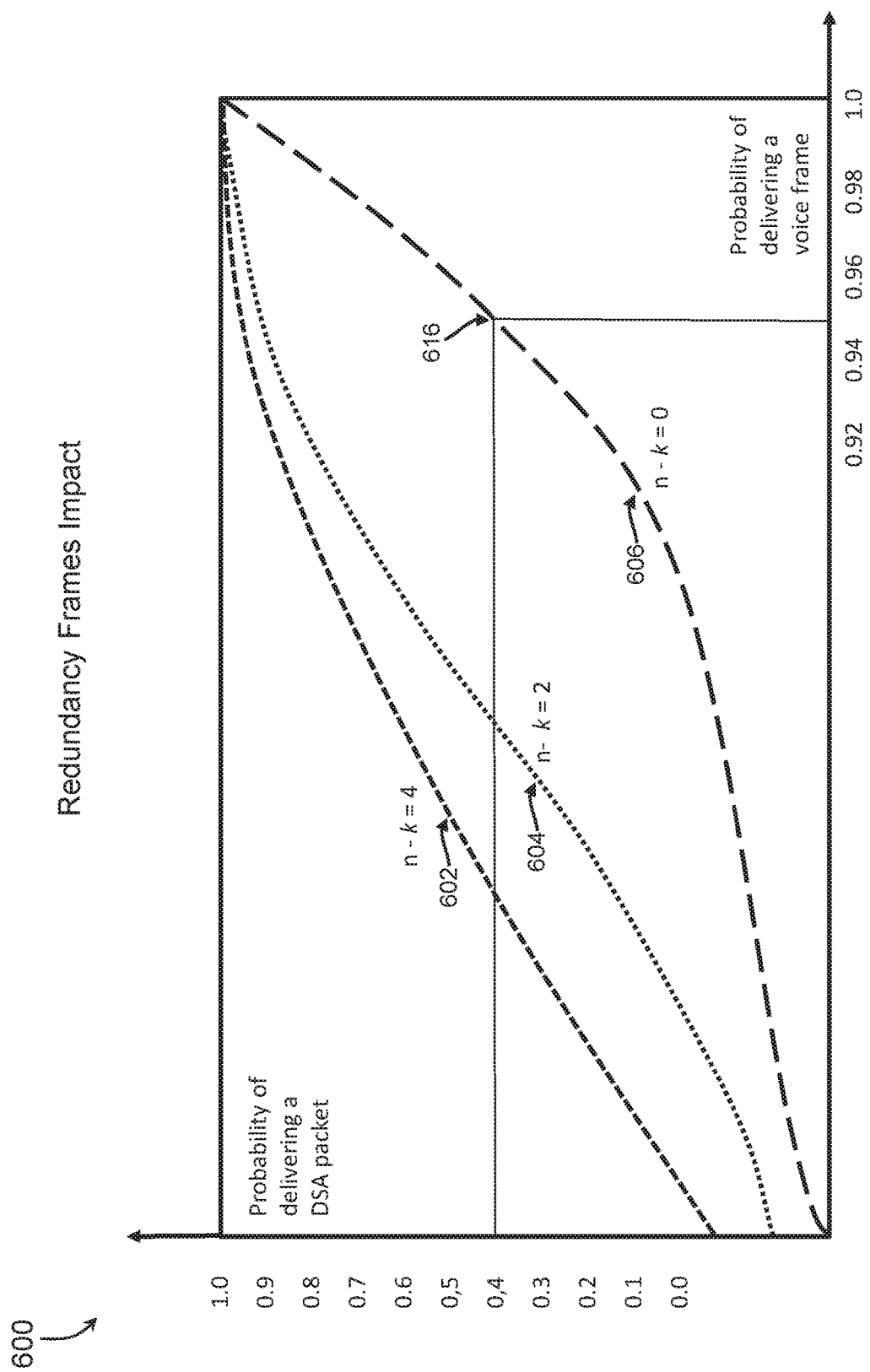
FIG. 6 is a reliability graph in accordance with one embodiment of the inventive concepts disclosed herein.

Referring now to FIG. 6, a reliability graph in accordance with one embodiment of the inventive concepts disclosed herein is shown. A probability of reliability graph 600 may indicate one advantage of the controller 110 including additional redundancy DSA frames 346 within the DSA control message sent over the voice channel to ensure reception by a first node and retransmission to additional nodes. The probability of reliability graph 600 may be intended to show the effect of the utilized error control erasure coding on DSA IP packet reliability and may be not to scale. The x-axis of the graph may represent a probability of delivering a voice frame 340 while the y-axis may represent the probability of delivering a DSA control packet 330.

A curve indicating a zero redundancy DSA frames 606 (n−k=0) indicating a lesser probability of delivering the DSA packet intact. Here, a slight decrease of the probability of delivering a voice frame will cause a large drop of the probability of delivering a DSA packet. At an expected probability of delivering a voice frame of 0.95, which may be typical of military radios voice reliability, the probability of reliability delivering a DSA IP packet at a point 616 may be less than 0.5 (50%), which may be unacceptable. This sharp drop is due to the fact that one DSA IP packet can be broken down in more than 20 voice frames. A loss of 1 of the 20 voice frames can cause a loss of the entire IP packet because the comsec layer tends to drop any voice chunk that have an error even if the error is a single bit.

A curve indicating two redundancy DSA frames 604 (n−k=2) may indicate a greater probability of delivering the DSA packet intact. With controller 110 adding two redundancy DSA frames 346, the powerful impact of using erasure coding may be indicated where the erasure size is the frame size. The curve 604 may illustrate the case of adding two redundancy DSA frames 346 to the segmented DSA IP packet. The drastic improvement of the probability of delivering the DSA control packet may be due to the fact that the DSA control packet may be reconstructed if 1) no frames are lost, 2) if one frame is lost and 3) if two frames are lost. The probability of losing three or more frames in one transmission may be significantly lower than losing a single frame in the transmission.

As expected, a curve indicating four redundancy DSA frames 602 (n−k=4) may indicate a higher probability of delivering the DSA packet intact. Here, the DSA control packet may be reconstructed if 1) no frames are lost, 2) if one frame is lost, 3) if two frames are lost, 4) if three frames are lost and 5) if four frames are lost. The probability of losing five or more frames in one transmission is significantly lower than the case depicted with the 606 curve.

FIG. 7

Figure 7:
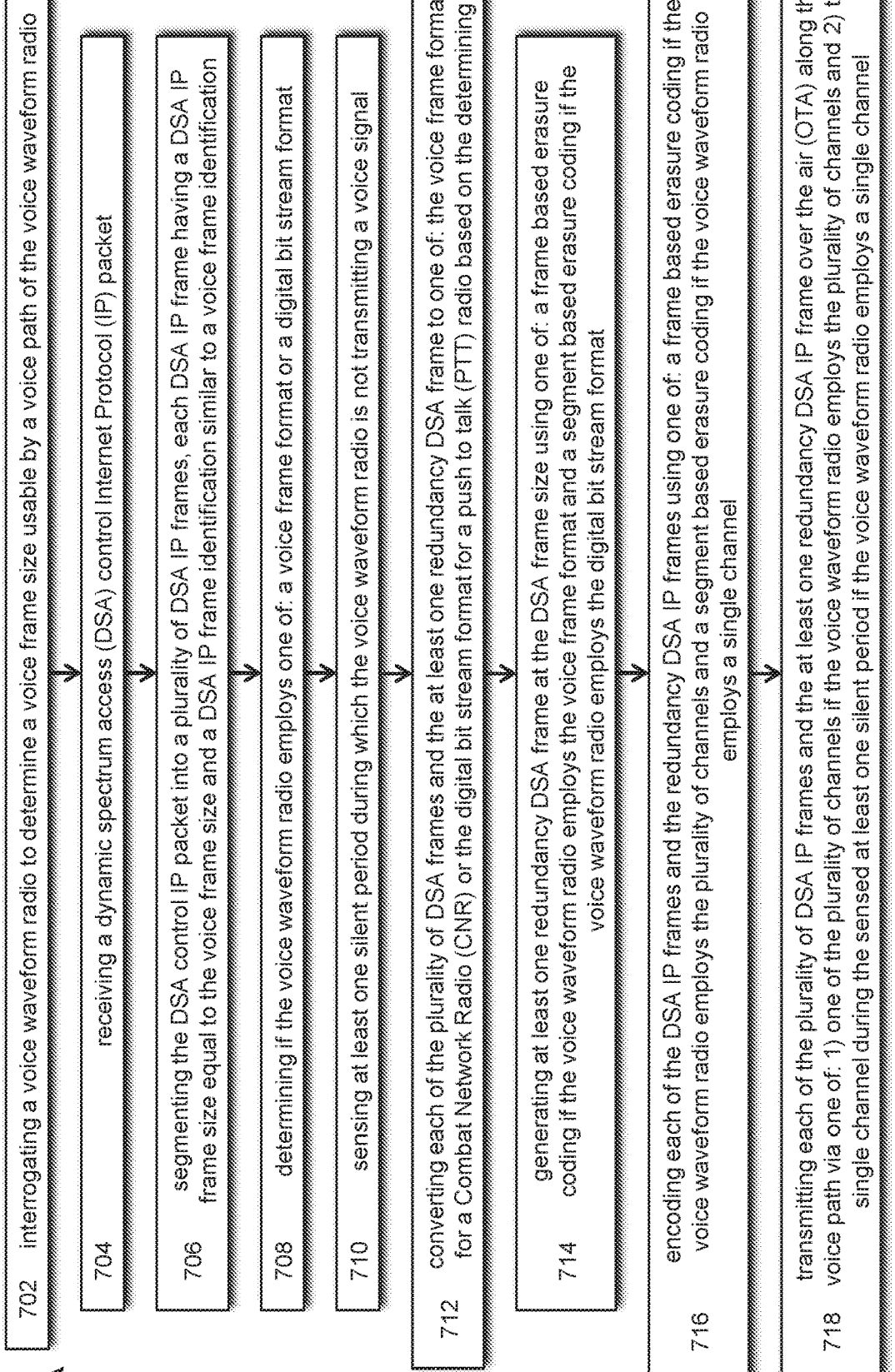
FIG. 7 is a diagram of an exemplary method flow in accordance with one embodiment of the inventive concepts disclosed herein.

Referring now to FIG. 7, a diagram of an exemplary method flow in accordance with one embodiment of the inventive concepts disclosed herein is shown. A method flow 700 may include, at a step 702, interrogating a voice waveform radio to determine a voice frame size usable by a voice path of the voice waveform radio and, at a step 704, receiving a dynamic spectrum access (DSA) control Internet Protocol (IP) packet. A step 706 may include segmenting the DSA control IP packet into a plurality of DSA IP frames, each DSA IP frame having a DSA IP frame size equal to the voice frame size and a DSA IP frame identification similar to a voice frame identification while a step 708 may include determining if the voice waveform radio employs one of: a voice frame format or a digital bit stream format.

A step 710, sensing at least one silent period during which the voice waveform radio is not transmitting a voice signal. A step 712 may include converting each of the plurality of DSA frames and the at least one redundancy DSA frame to one of: the voice frame format for a Combat Network Radio (CNR) or the digital bit stream format for a push to talk (PTT) radio based on the determining while a step 714 may include generating at least one redundancy DSA frame at the DSA frame size using one of: a frame based erasure coding if the voice waveform radio employs the voice frame format and a segment based erasure coding if the voice waveform radio employs the digital bit stream format.

A step 716 may include encoding each of the DSA IP frames and the at least one redundancy DSA IP frame using one of: a frame based erasure coding if the voice waveform radio employs the voice frame format and a segment based erasure coding if the voice waveform radio employs the digital bit stream format. A step 718 may include transmitting each of the plurality of DSA frames and the at least one redundancy DSA frame over the air (OTA) along the radio voice path via one of: 1) one of the plurality of channels and 2) the single channel during the sensed at least one silent period.

CONCLUSION

As will be appreciated from the above description, embodiments of the inventive concepts disclosed herein may provide a novel solution to adding a DSA capability to currently deployed military systems using existing military waveforms.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for dynamic spectrum access control signals over a voice channel, comprising:
   a voice waveform radio having one of: a plurality of channels and a single channel, the voice waveform radio configured to transmit and receive via a radio voice path;
   a controller operatively coupled with the voice waveform radio;
   a tangible, non-transitory memory configured to communicate with the controller, the tangible, non-transitory memory having instructions stored therein that, in response to execution by the controller, cause the controller to:
   interrogate the voice waveform radio to determine a voice frame size usable by the voice waveform radio;
   receive a dynamic spectrum access (DSA) control packet initiated by a user;
   segment the DSA control packet into a plurality of DSA frames, each DSA frame having a DSA frame size equal to the voice frame size;
   determine if the voice waveform radio employs one of: a voice frame format or a digital bit stream format;
   sense at least one silent period during which the voice waveform radio is not transmitting a voice signal;
   convert each of the plurality of DSA frames to one of the voice frame format or the digital bit stream format based on the determining;
   generate at least one redundancy DSA frame at the DSA frame size using one of: a frame based erasure coding if the voice waveform radio employs the voice frame format and a segment based erasure coding if the voice waveform radio employs the digital bit stream format;
   encode each of the plurality of DSA frames and the at least one redundancy DSA frame using one of: the frame based erasure coding if the voice waveform radio employs the voice frame format and the segment based erasure coding if the voice waveform radio employs the digital bit stream format; and
   transmit each of the plurality of DSA frames and the at least one redundancy DSA frame over the air (OTA) along the radio voice path via one of: 1) one of the plurality of channels and 2) the single channel during the sensed at least one silent period.

2. The system for dynamic spectrum access control signals over a voice channel of claim 1, wherein the voice waveform radio having the voice frame format is a combat network radio (CNR) and the voice waveform radio having the digital bit stream format is one of: an analog push to talk (PTT) radio and a digital PTT radio.

3. The system for dynamic spectrum access control signals over a voice channel of claim 1, wherein the DSA frame size is dynamic based on at least one characteristic of the voice waveform radio.

4. The system for dynamic spectrum access control signals over a voice channel of claim 1, wherein the at least one redundancy DSA frame further comprises a dynamic number of the at least one redundancy DSA frame based on at least one characteristic of the radio voice path.

5. The system for dynamic spectrum access control signals over a voice channel of claim 1, wherein the controller is further configured to measure a frame loss ratio of the voice path and dynamically increase or decrease a number of the at least one redundancy DSA frame to achieve a desired frame reception reliability.

6. The system for dynamic spectrum access control signals over a voice channel of claim 1, wherein generate at least one redundancy DSA frame further comprises receive a level of importance of the plurality of DSA frames and dynamically increase a number of the at least one redundancy DSA frame to increase a frame reception reliability.

7. The system for dynamic spectrum access control signals over a voice channel of claim 1, wherein the controller is further configured to:
   receive each of the plurality of DSA frames and the at least one redundancy DSA frame;
   decode each of the plurality of DSA frames and the at least one redundancy DSA frame using one of: the frame based erasure coding and the segment based erasure coding;
   convert one of: the voice frame format if the voice waveform radio employs the voice frame format or digital bit stream format if the voice waveform radio employs the digital bit stream format to the plurality of DSA IP frames;
   replace a lost one of the plurality of DSA frames with a received at least one redundancy DSA frame if one of the plurality of DSA frames becomes lost;
   assemble the DSA control packet based on at least one of the plurality of DSA frames; and
   configure a voice waveform radio at a receiving node based on the data within the DSA control packet.

8. The system for dynamic spectrum access control signals over a voice channel of claim 1, wherein receive the DSA control packet further comprises receiving one of a DSA internet protocol (IP) control packet and a Joint Tactical Information Distribution System (JTIDS) control message.

9. The system for dynamic spectrum access control signals over a voice channel of claim 1, wherein each of the plurality of DSA frames is further configured with a DSA frame identification similar to a voice frame identification.

10. The system for dynamic spectrum access control signals over a voice channel of claim 1, wherein transmit each of the plurality of DSA frames and the at least one redundancy DSA frame OTA along the radio voice path further comprises a random transmission of a combined plurality of DSA frames and the at least one redundancy DSA frame and further includes the plurality of DSA frames routed to a first channel and the at least one redundancy DSA frame routed to a second channel.

11. A method for dynamic spectrum access control signals over a voice channel, comprising:
   interrogating a voice waveform radio to determine a voice frame size usable by a voice path of the voice waveform radio;
   receiving a dynamic spectrum access (DSA) control Internet Protocol (IP) packet;
   segmenting the DSA control IP packet into a plurality of DSA IP frames, each DSA IP frame having a DSA IP frame size equal to the voice frame size and a DSA IP frame identification similar to a voice frame identification;

determining if the voice waveform radio employs one of: a voice frame format or a digital bit stream format;

sensing at least one silent period during which the voice waveform radio is not transmitting a voice signal;

converting each of the plurality of DSA frames and the at least one redundancy DSA frame to one of: the voice frame format for a Combat Network Radio (CNR) or the digital bit stream format for a push to talk (PTT) radio based on the determining;

generating at least one redundancy DSA frame at the DSA frame size using one of: a frame based erasure coding if the voice waveform radio employs the voice frame format and a segment based erasure coding if the voice waveform radio employs the digital bit stream format;

encoding each of the DSA IP frames and the at least one redundancy DSA IP frame using one of: the frame based erasure coding if the voice waveform radio employs the voice frame format and the segment based erasure coding if the voice waveform radio employs the digital bit stream format; and transmitting each of the plurality of DSA frames and the at least one redundancy DSA frame over the air (OTA) along the voice path via one of: 1) one of a plurality of channels and 2) a single channel during the sensed at least one silent period.

12. The method for dynamic spectrum access control signals over a voice channel of claim 11, wherein the method further comprises receiving each of the plurality of DSA frames and the at least one redundancy DSA frame;

decoding each of the plurality of DSA frames and the at least one redundancy DSA frame using one of: the frame based erasure coding and the segment based erasure coding;

converting one of: the voice frame format if the voice waveform radio employs the voice frame format or digital bit stream format if the voice waveform radio employs the digital bit stream format to the plurality of DSA IP frames;

replacing a lost one of the plurality of DSA frames with a received at least one redundancy DSA IP frame if one of the plurality of DSA frames becomes lost;

assembling the DSA control packet from at least one of the plurality of DSA frames; and configure a voice waveform radio at a receiving node based on the data within the DSA control packet.

13. The method for dynamic spectrum access control signals over a voice channel of claim 11, wherein generating the at least one redundancy DSA IP frame further includes dynamically changing a number of the at least one redundancy DSA IP frame based on at least one characteristic of the voice path.

14. The method for dynamic spectrum access control signals over a voice channel of claim 11, wherein generating the at least one redundancy DSA IP frame further comprises measuring a frame loss ratio of the voice path and dynamically increasing or decreasing a number of the at least one redundancy DSA IP frame to achieve a desired frame reception reliability.

15. The method for dynamic spectrum access control signals over a voice channel of claim 11, wherein transmitting each of the plurality of DSA frames and the at least one redundancy DSA frame OTA along the voice path further comprises a transmission order including: transmitting the plurality of DSA frames first at a pace to finish transmission contemporaneously with a completion of the generating the at least one redundancy DSA frame, and transmitting the at least one redundancy DSA frame second.

\* \* \* \* \*